(12) United States Patent
Kim

(10) Patent No.: US 12,435,994 B2
(45) Date of Patent: Oct. 7, 2025

(54) INFORMATION PROVIDING PLATFORM FOR UPDATING MAP

(71) Applicant: THE INDUSTRY & ACADEMIC COOPERATION IN CHUNGNAM NATIONAL UNIVERSITY, Daejeon (KR)

(72) Inventor: Ki Il Kim, Daejeon (KR)

(73) Assignee: The Industry & Academic Cooperation in Chungnam National University, Daejeon (KR)

( * ) Notice: Subject to any disclaimer, the term of this patent is extended or adjusted under 35 U.S.C. 154(b) by 0 days.

(21) Appl. No.: 18/718,771

(22) PCT Filed: Mar. 17, 2022

(86) PCT No.: PCT/KR2022/003737
§ 371 (c)(1),
(2) Date: Jun. 11, 2024

(87) PCT Pub. No.: WO2023/132405
PCT Pub. Date: Jul. 13, 2023

(65) Prior Publication Data
US 2025/0067575 A1    Feb. 27, 2025

(30) Foreign Application Priority Data
Jan. 7, 2022    (KR) ........................ 10-2022-0002751

(51) Int. Cl.
*G01C 21/00* (2006.01)
*G06V 10/82* (2022.01)
(Continued)

(52) U.S. Cl.
CPC ......... *G01C 21/3859* (2020.08); *G06V 10/82* (2022.01); *G06V 20/176* (2022.01); *H04N 7/183* (2013.01); *G06Q 30/0226* (2013.01)

(58) Field of Classification Search
CPC ..... G06V 20/56; G06V 20/58; G01C 21/3859
(Continued)

(56) References Cited

U.S. PATENT DOCUMENTS

| 10,212,541 | B1 | 2/2019 | Brody et al. |
| 2012/0166074 | A1 | 6/2012 | Weng et al. |

(Continued)

FOREIGN PATENT DOCUMENTS

| KR | 10-2011-0037045 A | 4/2011 |
| KR | 10-1226731 B1 | 1/2013 |

(Continued)

*Primary Examiner* — Jeffery A Williams
(74) *Attorney, Agent, or Firm* — You & IP, LLC

(57) ABSTRACT

The present invention is characterized by comprising: a plurality of user terminals for transmitting location information to a server; a photographing unit for capturing an image by means of a camera installed in a dash cam or a camera provided in the user terminal; an activation unit that activates an area where a preset update cycle has been exceeded as an area where information can be updated; an image transmission unit that, when location information of the user terminal received by the server is detected as the area activated by the activation unit, transmits the image captured by the photographing unit to the server through the user terminal; an image analysis unit that extracts map information including store information and terrain information from the image that the image transmission unit has transmitted to the server, and compares the map information with existing map information stored in the server to extract changed map information; and an updating unit that updates the existing map information with the changed map information extracted from the image analysis unit.

5 Claims, 5 Drawing Sheets

(51) Int. Cl.
*G06V 20/10* (2022.01)
*H04N 7/18* (2006.01)
*G06Q 30/0226* (2023.01)

(58) Field of Classification Search
USPC .......................................................... 348/148
See application file for complete search history.

(56) References Cited

U.S. PATENT DOCUMENTS

2021/0097103 A1    4/2021  Kang et al.
2023/0237799 A1*   7/2023  Mugura ................ G01C 21/20

FOREIGN PATENT DOCUMENTS

| KR | 10-2013-0012430 A | 2/2013 |
| KR | 10-1589928 B1 | 2/2016 |
| KR | 10-2017-0132414 A | 12/2017 |
| KR | 10-2019-0141892 A | 12/2019 |
| KR | 10-2020-0002996 A | 1/2020 |
| KR | 10-2021-0056560 A | 5/2021 |
| KR | 10-2021-0058408 A | 5/2021 |
| WO | 2018-201106 A1 | 11/2018 |

* cited by examiner

INFORMATION PROVIDING PLATFORM FOR UPDATING MAP

TECHNICAL FIELD

The present disclosure relates to an information providing platform for updating a map and, more particularly, to an information providing platform that provides automatic updates of map information used by a navigation company, etc.

BACKGROUND ART

With recent technological advancements, the number of companies providing map information such as location information, directions, and information on nearby stores is increasing. A map information provision service not only searches spaces, but also connects information on all spaces, including places, buses, subways, and roads, through a single search. In addition, the map information provision service is evolving to provide daily life information about stores such as restaurants, convenience stores, and cafes near a location that you are looking for.

FIG. 1 illustrates a graph showing the trend of start-up corporations. Referring to FIG. 1, the number of start-up corporations continues to increase from 62,000 in 2000 to 123,000 in 2020. Therefore, map information service providers are required to periodically update information about continuously changing companies and stores. Currently, in order to update information about companies and stores, map information service providers and navigation companies, etc. directly use vehicles of employees to collect related data. However, this method causes inconvenience because a vehicle is required to directly move to a corresponding location for updating. In addition, the method of going directly to the corresponding location and updating manually has the problem that a lot of labor, time, and cost are consumed, and it takes a long time for the update to be completed.

In this regard, Korean Patent No. 10-1589928 discloses a digital map update system of changed terrain features through GPS checks. The prior document provides the digital map update system of changed terrain features through GPS checks, in which when there is a change in information of the building name, facility name, or representative tenant companies of a building or facility displayed on a digital map, subjects of changing information of building owners (facility owners) or tenant company representatives are able to transmit the fact of a change in geographic information in the digital map and specific change information to a GIS server through kiosk-type terminal devices, wherein the GIS server is able to continuously maintain the accuracy of the digital map by creating a new final update whenever there is a change in the geographic information in the digital map by reflecting information received from time to time through the kiosk-type terminal devices on the digital map, and by keeping an imaging device horizontal at all times, more accurate shooting and the updating and production of the digital map are possible.

As mentioned above, a number of prior documents have been proposed that reflect various changes in geographic information in a digital map. However, in the conventional case, the subject of changed information is required to directly transmit the changed information to the server through a kiosk, so the problem that manual updating is required remains unsolved.

DOCUMENT OF RELATED ART

Patent Document

Patent Document 1. Korean Patent No. 10-1589928

DISCLOSURE

Technical Problem

The purpose of the present disclosure is to provide an information providing platform for updating a map which updates map information periodically and automatically in order to solve the problem that an existing map information update is performed manually.

Technical Solution

In order to accomplish the above objective, a platform for providing information for updating a map, the platform of the present disclosure includes: a plurality of user terminals configured to transmit location information to a server; a photographing unit configured to capture an image by using a camera in a dash cam or a camera in each of the user terminals; an activation unit configured to activate an area in which a preset update cycle has been exceeded to an area in which information is updatable; an image transmission unit configured to transmit the image captured by the photographing unit from the user terminal to the server when the location information from the user terminal received by the server is detected as that of the area in which information is updatable; an image analysis unit configured to extract map information comprising store information and terrain information from the image that the image transmission unit has transmitted to the server and to compare the map information with existing map information stored in the server to extract changed map information; and an updating unit configured to update the existing map information with the changed map information extracted by the image analysis unit.

Preferably, the image analysis unit may extract the changed map information by using an artificial neural network which has been trained.

Preferably, the image transmission unit may request image transmission consent from a user located in the area activated by the activation unit and transmit the captured image to the server when there is the consent of the user.

Preferably, the image transmission unit may request the image transmission consent from a user who first entered the activated area, and transmit a signal to deactivate the activated area to the activation unit when the user consents.

Preferably, the information providing platform may further include: a reward payment unit configured to provide rewards including savings, mileage, or points to a user who consents to the image transmission.

Advantageous Effects

According to the present disclosure, there is an advantage that costs are reduced and the latest information is able to be quickly updated since a business does not have to go directly to a corresponding location to update map information.

BEST MODE

Figure 1:
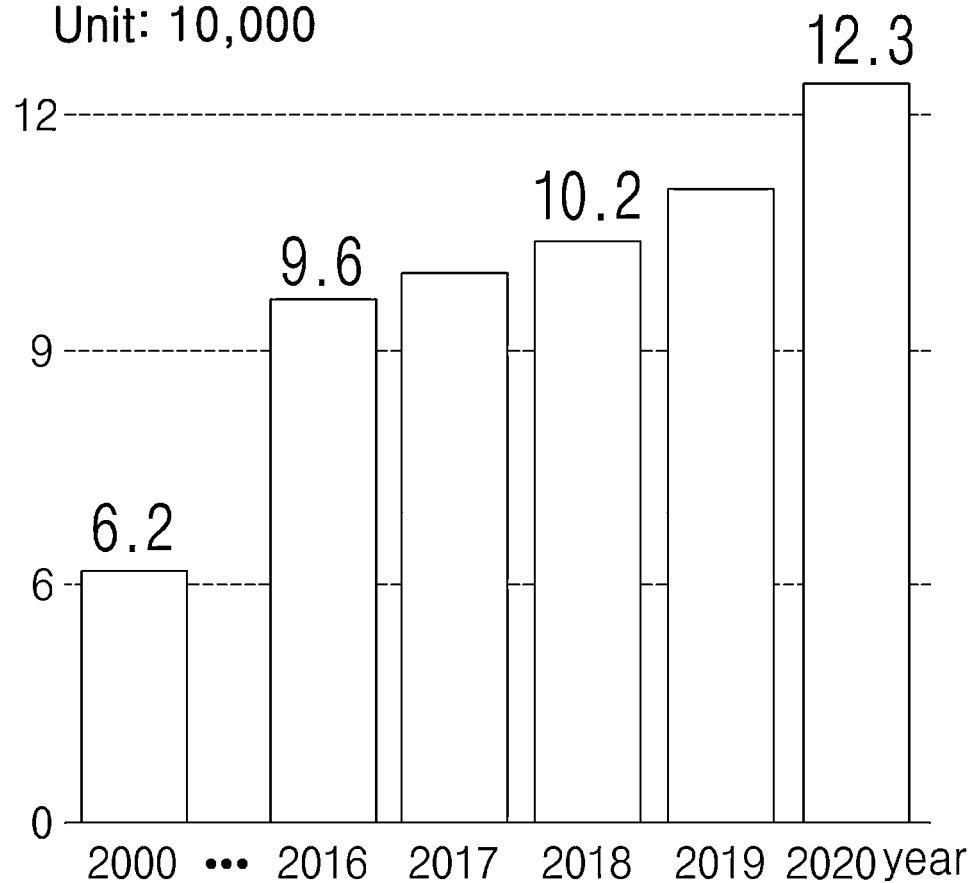
FIG. 1 illustrates a graph showing the trend of start-up corporations.

Hereinafter, the present disclosure will be described in detail with reference to contents described in the attached drawings. However, the present disclosure is not limited or restricted by illustrative embodiments. The same reference numerals in each drawing indicate members that perform substantially the same function.

The purpose and effect of the present disclosure may be naturally understood or made clearer by the explanation below, and the purpose and effect of the present disclosure are not limited to the description below. Additionally, when explaining the present disclosure, when it is determined that a detailed description of the publicly known technology related to the present disclosure may unnecessarily obscure the gist of the present disclosure, detailed description thereof will be omitted.

Figure 2:
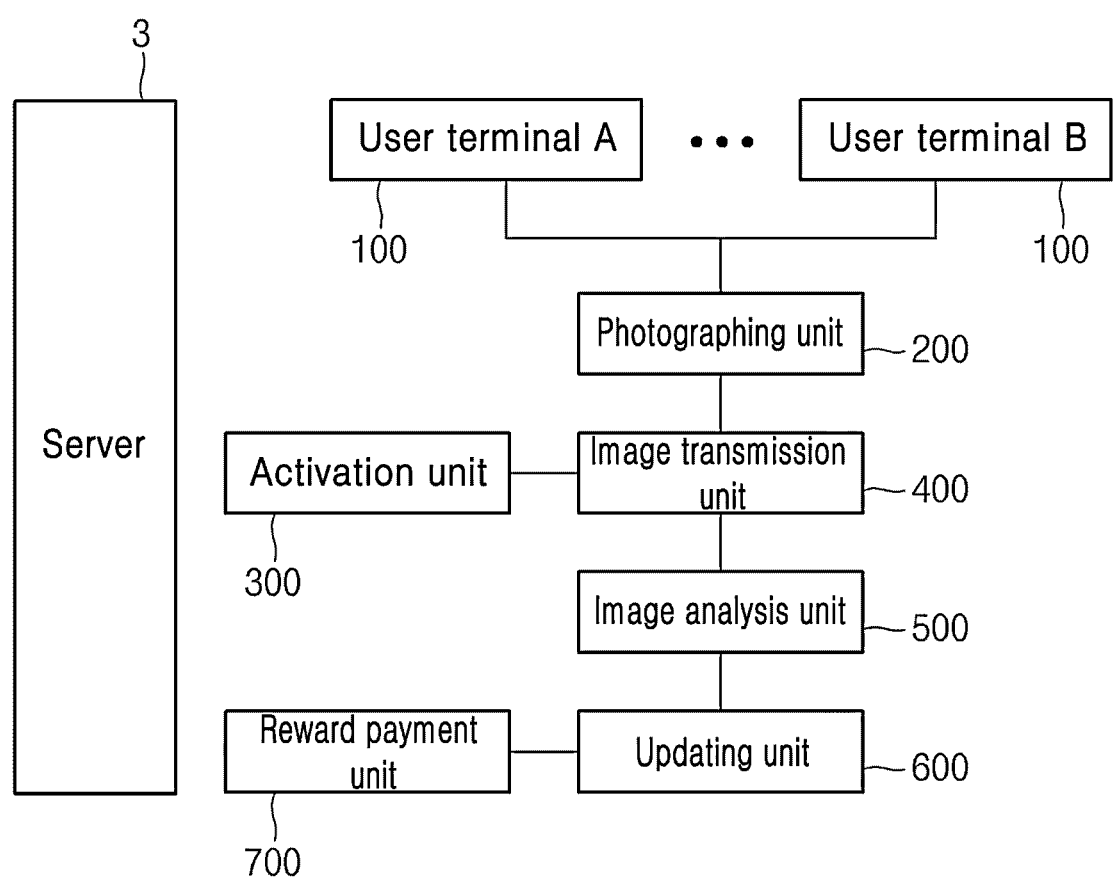
FIG. 2 illustrates a configuration diagram of an information
providing platform according to an embodiment of the present disclosure.
Figure 5:
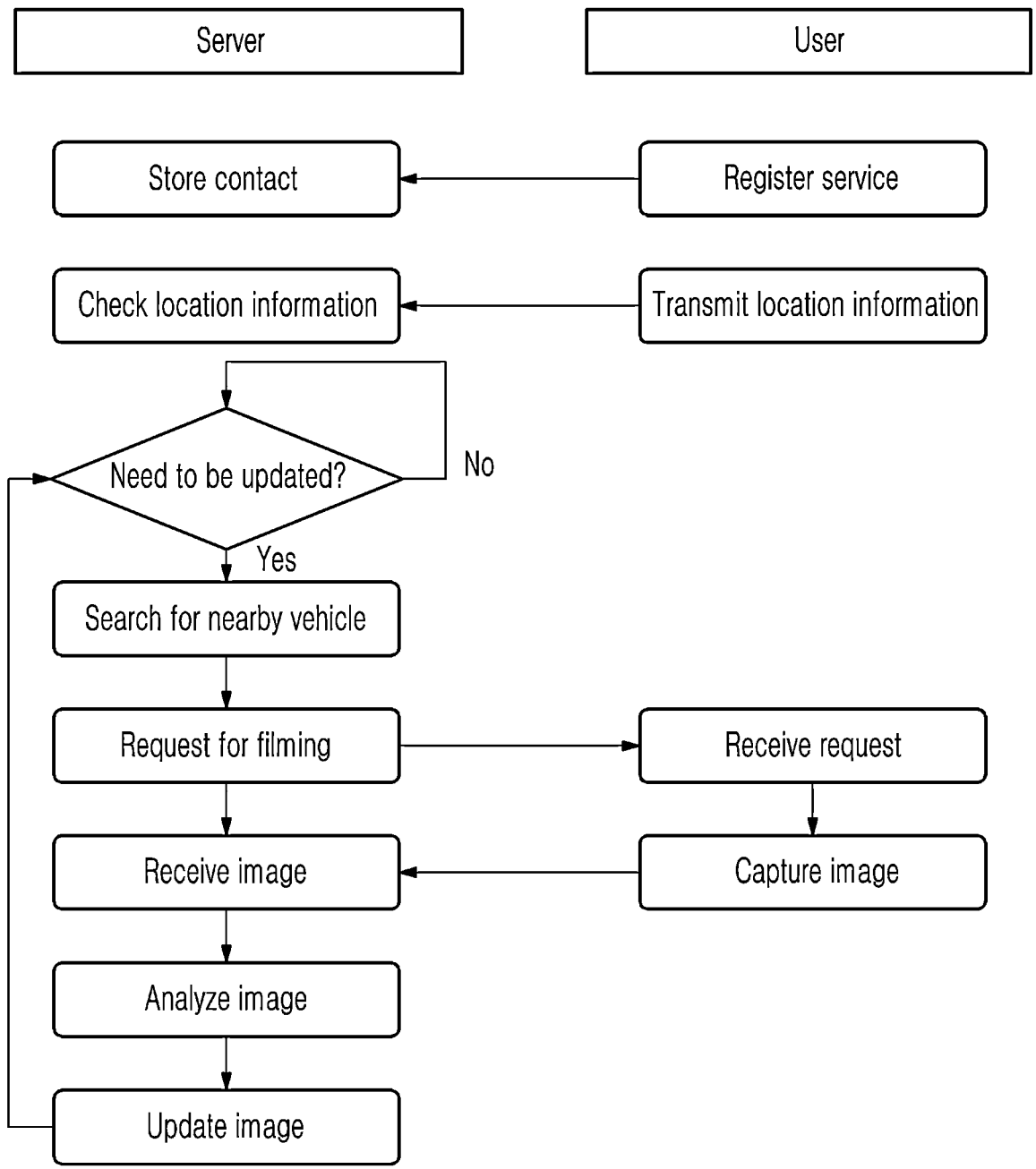
FIG. 5 illustrates a flowchart of the information providing platform according to the embodiment of the present disclosure.

FIG. 2 illustrates a configuration diagram of an information providing platform 10 according to the embodiment of the present disclosure. Referring to FIG. 2, the information providing platform 10 may include a plurality of user terminals 100, a photographing unit 200, an activation unit 300, an image transmission unit 400, an image analysis unit 500, an updating unit 600, and a reward payment unit 700. Here, the platform 10 means computer architecture and equipment (e.g., server, a hardware processor) using a particular operating system. As an example, the platform 10 can be implemented by a server as illustrated in FIG. 5.

Map information described below may be understood as a concept that includes store information such as a store name and a phone number, etc. that can be found on the exterior of the building, such as the signboard, exterior wall, and window, etc. of a company or store, and topographical information, such as a building and a road, etc.

The information providing platform 10 is able to periodically update information about companies and stores that are rapidly opening, closing, or renewing. Unlike the existing method in which a company directly collects information to update map information, the information providing platform 10 may collect information by using cameras of users moving around, thereby reducing costs such as labor and quickly reflecting the latest information. The information providing platform 10 may periodically or automatically update topographical information such as changes in geographic features, and new construction and demolition of buildings. The information providing platform 10 may provide updated map information to navigation companies or portals, etc.

The information providing platform 10 may quickly update the latest map information by using multiple vehicles or users provided with smartphones moving on roads and streets. The information providing platform 10 may obtain the latest map information from a user rather than a company and update existing map information. The information providing platform 10 may promote map information updating by providing a predetermined reward to a user who provides the latest map information. The information providing platform 10 may extract changes in map information by analyzing the existing image of a specific area stored in a server 3 and the latest image transmitted by a user.

When it is detected that the location of each of the user terminals 100 registered on the server is within an area that requires updating, the information providing platform 10 may send an image provision request to the corresponding user terminal 100. The information providing platform 10 may receive an image captured from the user terminal 100, which has agreed to the image provision request.

The server 3 may be understood as an internet environment for receiving information, such as captured video images, which will be described later. The server 3 may include a database that is cable to store existing map information. The server 3 may store the update date of existing map information. The server 3 may be networked with the user terminal 100 through Bluetooth, Wi-Fi, or a 4/5G communication environment, wherein the network environment with the user terminal is intended to implement image transmission and a reward payment function that will be described later.

The server 3 may register users by storing identification numbers such as the phone numbers of the user terminals 100 that will provide captured images. The server 3 may continuously receive location information of the plurality of user terminals 100.

The user terminal 100 may refer to an input/output device for a user to communicate with a data processing system. The user terminal 100 may be connected to the server 3 to transmit and receive data. The user terminal 100 may transmit an image captured by the photographing unit 200 to the server 3. The user terminal 100 may receive a reward paid by the reward payment unit 700. The user terminal 100 may refer to a personal digital assistant (PDA), a smartphone, a tablet, or a PC, etc. The user terminal 100 may be registered on the server 3 as an identification number such as a phone number. The user terminal 100 may refer to each terminal of a plurality of users that is able to provide location information and captured images to the server 3.

The user terminal 100 may transmit location information to the server 3. The user terminal 100 may include GPS to track the location of a user. GPS may be included in a traffic information provision device such as navigation in the vehicle of a user in addition to the user terminal. The user terminal 100 may transmit location information to the server 3 at regular intervals. The user terminal 100 may transmit location information to the server 3 to provide data for determining whether a user is located in an area that requires updating.

Figure 3:
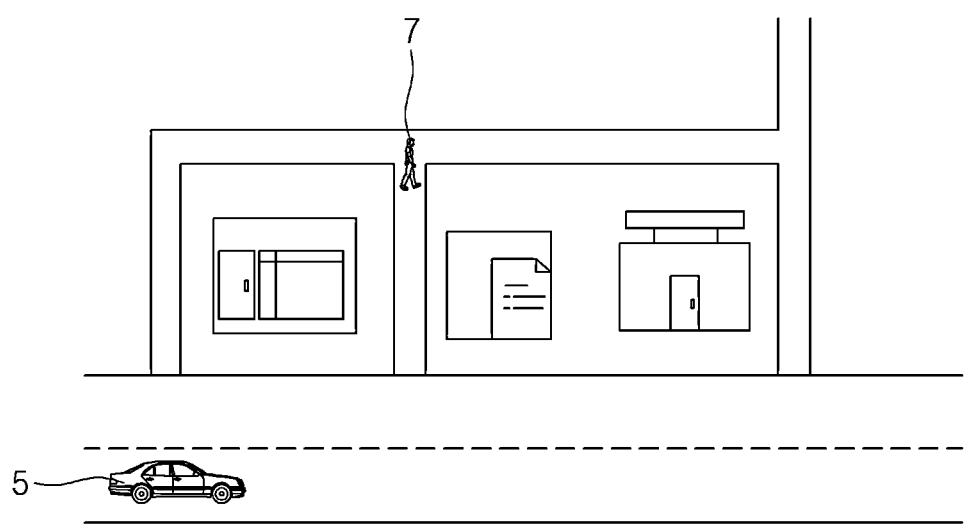
FIG. 3 illustrates a schematic diagram of surrounding terrain and stores photographed by a photographing unit according to the embodiment of the present disclosure.

FIG. 3 illustrates a schematic diagram of surrounding terrain and stores photographed by the photographing unit according to the embodiment of the present disclosure. Referring to FIG. 3, the photographing unit 200 may capture an image by using a camera in a dash cam or a camera in the user terminal 100. The photographing unit 200 may provide the captured image to the server 3. The photographing unit 200 may transmit the captured image to the server 3 through the user terminal 100. The photographing unit 200 may capture an image only when there is consent to the image transmission consent request of the image transmission unit 400.

The photographing unit 200 may capture surrounding images by using the camera in the dash cam. The camera in the dash cam may move the focus of the camera to a side when a user consents to the image transmission consent request of the image transmission unit 400. The camera in the dash cam may solve the problem of not being able to easily collect information about a roadside (a side) since an existing camera for a dash cam captures images primarily in the front or rear.

The dash cam may include hardware that is able to change the angle of the camera. The dash cam may change the angle of the camera to the side when a user consents to the image transmission consent request of the image transmission unit 400. The camera angle change hardware included in the dash cam is able to solve the problem that since an existing camera for a dash cam performs capturing by focusing on the front or rear side, the existing camera is not able to easily collect information about a roadside (a side).

The photographing unit 200 may capture surrounding images with a camera in the user terminal 100. That is, when there is a request to capture images, a user may directly use the camera of the user terminal 100 to capture surrounding images. This is intended to update map information of narrow streets that vehicles are not able to enter. A user may capture surrounding images up to a location specified in an image capture request and provide the images to the server 3. More rewards may be provided to users who have filmed images themselves.

The activation unit 300 may activate an area in which a preset update cycle has been exceeded to an area in which information is updatable. The activation unit 300 may divide a road that people or vehicles are able to pass into specific areas. The activation unit 300 may set an update cycle to update map information for each divided area. The activation unit 300 may have the update cycle set by a user or an administrator.

The activation unit 300 may determine whether the update cycle has been exceeded after the map information in the divided area was most recently updated. The activation unit 300 may deactivate an area in which the update cycle has been exceeded and activate an area in which the update cycle has not been exceeded. The activated area is an area that requires a map information update, and the deactivated area is an area that does not require a map information update.

When the activation unit 300 receives a first deactivation signal, the activation unit 300 may prevent the image transmission unit 400 from requesting image transmission consent from another user. When the activation unit 300 receives a second deactivation signal, the activation unit 300 may reset the update cycle.

When the location information of the user terminal 100 received by the server 3 is detected as the area in which information is updatable, the image transmission unit 400 may transmit the image captured by the photographing unit 200 to the server 3 through the user terminal 100. When the plurality of user terminals 100 is detected in the activated area, the image transmission unit 400 may transmit an image captured by a user terminal 100, which first entered the corresponding area, to the server 3. The image transmission unit 400 may transmit real-time videos, recorded videos, or images captured by the photographing unit 200 to the server 3.

The image transmission unit 400 may request the image transmission consent from a user located in the area activated by the activation unit 300 and may transmit the captured image to the server 3 when the user consents. The image transmission unit 400 may request the image transmission consent from a user who first entered the activated area and may transmit the first deactivation signal to deactivate the corresponding area to the activation unit 300 when the user consents.

When a user has already consented to image transmission, the image transmission unit 400 may not request image transmission consent from another user. In other words, the image transmission unit 400 may prevent duplicate map information updates from occurring in the plurality of user terminals 100. However, the image transmission unit 400 may transmit a signal to activate a corresponding area to the activation unit 300 when map information is not updated by a user who consented to image transmission.

The image transmission unit 400 may transmit an image through the user terminal 100 of a user who has agreed to the provision of a service. The image transmission unit 400 may provide a captured image to the image analysis unit 500 for analysis of the captured image.

Figure 4:
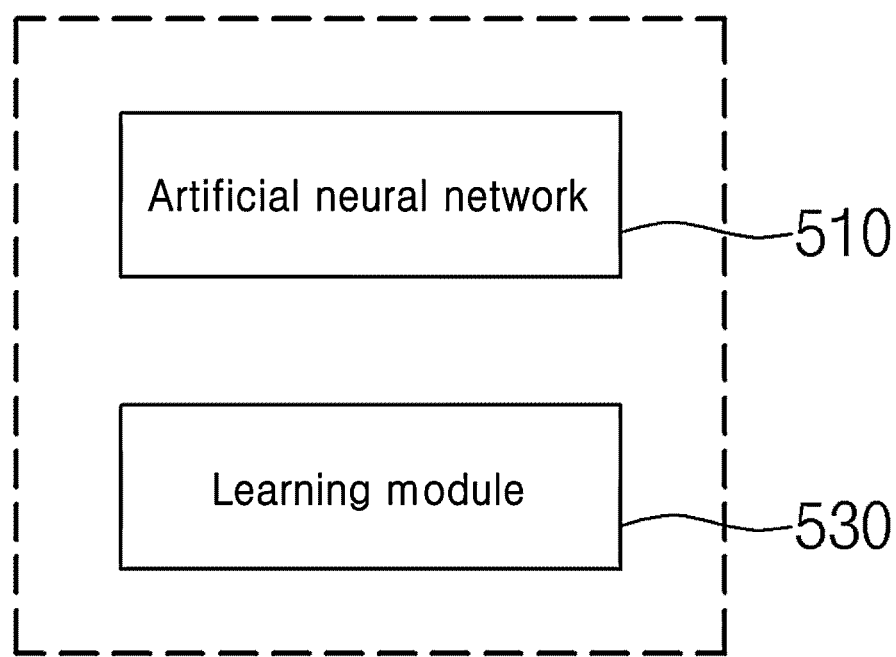
FIG. 4 illustrates a configuration diagram of an image analysis unit according to the embodiment of the present disclosure.

FIG. 4 illustrates a configuration diagram of the image analysis unit 500 according to the embodiment of the present disclosure. Referring to FIG. 4, the image analysis unit 500 may include an artificial neural network 510 and a learning module 530.

The image analysis unit 500 may extract map information including e information and terrain information from images transmitted by the image transmission unit 400 to the server 3 and may compare the map information with existing map information stored in the server 3 to extract changed map information. The image analysis unit 500 may extract store information such as store names, store contact information, company names, and company contact information from the images transmitted from the image transmission unit 400 to the server 3, and may compare the extracted store information with existing store information stored in the server 3. When the existing store information and the extracted store information are different, the image analysis unit 500 may transmit a map information update signal to the updating unit 600 to update with the extracted store information.

The image analysis unit 500 may extract terrain information such as buildings and roads from images transmitted from the image transmission unit 400 to the server 3 and may compare the extracted terrain information with existing terrain information stored in the server 3. When the existing terrain information and the extracted terrain information are different, the image analysis unit 500 may transmit a map information update signal to the updating unit 600 to update with the extracted terrain information.

The image analysis unit 500 may extract changed map information by using the artificial neural network 510 which has been trained. The artificial neural network 510 applies neural network algorithms (DNN, CNN) to extract map information such as store information and topographic information from captured images, and may extract a difference between the extracted map information and existing map information. The artificial neural network 510 may be trained in the learning module 530. The artificial neural network 510 may be trained with images or videos labeled with store names, store contact information, terrain, and building exterior, etc. The artificial neural network 510 may be trained by using a plurality of images or videos with differences in map information as input values and the differences in the map information as output values.

The learning module 530 may train the artificial neural network 510 with images or videos labeled with store names, store contact information, terrain, and building exterior, etc. That is, the learning module 530 may train the artificial neural network 510 by using labeled images or videos as input values and the store names, store contact information, terrain, and building exterior, etc. as output values. The learning module 530 may train the artificial neural network 510 by using a plurality of images or videos with differences in map information as input values and the differences in the map information as output values. The training by the learning module 530 may be performed in the server 3 or the user terminal 100.

The updating unit 600 may update the existing map information with the changed map information extracted by the image analysis unit 500. The updating unit 600 may update map information to allow the activation unit 300 to reset the update signal. When the map information is updated, the updating unit 600 may transmit the second deactivation signal to deactivate the corresponding area to the activation unit 300.

The reward payment unit 700 may provide rewards including savings, mileage, or points to a user who agreed to provide a service. The reward payment unit 700 may promote rapid updating of map information by rewarding an image provider. The reward payment unit 700 may play a role in creating an environment in which more people are able to provide images by rewarding image providers. The reward payment unit 700 may provide additional rewards to users who provide images captured directly by using the camera of the user terminal 100. This is intended to eliminate blind spots in updating by allowing users to take photos of areas that are difficult to take photos of with a vehicle.

FIG. 5 illustrates a flowchart of the information providing platform 10 according to the embodiment of the present disclosure. Referring to FIG. 5, a user who wants to provide information may register the identification number of the user terminal 100, such as contact information, on the server 3. The user terminal 100 registered on the information providing platform 10 may continuously transmit location information to the server 3.

The information providing platform 10 continuously determines whether an area is an area that is required to be updated because an update cycle has been exceeded or whether the area is an area in which the update cycle has not been exceeded. When it is determined that the area requires updating, the information providing platform 10 may search for vehicles or users located in the area that requires updating. The information providing platform 10 may send a request for transmitting captured images to a user who first entered the area requiring update. The information providing platform 10 may capture images by the photographing unit 200 when there is the consent of a user and transmit the images to the server 3.

Here, in order to prevent the transmission of duplicate images, the information providing platform 10 does not request image transmission from another user when a user has already consented to image provision. The information providing platform 10 may receive images through the server 3, extract a difference thereof from existing map information in the image analysis unit 500, and update the images. The information providing platform 10 may reset an update cycle again when the images are updated.

In the above, the present disclosure has been described in detail through the exemplary embodiment, but those skilled in the art to which the present disclosure belongs will understand that the above-described embodiment may be variously modified without departing from the scope of the present disclosure. Therefore, the scope of the rights of the present disclosure should not be limited to the described embodiment, but should be determined not only by the scope of the claims to be described later, but also by all changes or modified forms derived from concept equivalent to the scope of the claims.

DESCRIPTION OF THE REFERENCE NUMERALS IN THE DRAWINGS

3: Server
5: Vehicle
7: User
10: Information providing platform
100: User terminal
200: Photographing unit
300: Activation unit
400: Image transmission unit
500: Image analysis unit
600: Updating unit
700: Reward payment unit

The invention claimed is:

1. A platform for providing information for updating a map, the platform is configured to:
   transmit location information to a server;
   capture an image by using a camera in a dash cam or a camera in each of the user terminals;
   activate an area in which a preset update cycle has been exceeded to an area in which information is updatable;
   transmit the image captured by the user terminal to the server when the location information from the user terminal received by the server is detected as that of the area in which information is updatable;
   extract map information comprising store information and terrain information from the image and to compare the map information with map information included in an existing map stored in the server to extract changed map information; and
   update the existing map with the changed map information,
   wherein the platform is further configured to:
      divide the existing map into specific areas based on roads and set an update cycle for each of the specific areas to update the map information;
      request a consent for transmitting the image to a first user who first entered an activated area of the specific areas, and deactivate the activated area when the user consents;
      train a first artificial neural network by using a plurality of images or videos with differences in map information as input values, and the differences in the map information as output values,
      train a second artificial neural network with images or videos labeled with the map information including store names, store contact information, terrain, and building exterior as input values, and the map information as output values,
      deactivate the activated area when the map information of the activated area is updated,
      not request the consent for transmitting the image to a second user when the first user has already consented to image transmission, and
      reset the update cycle when the activated area is deactivated.

2. The platform for providing information for updating a map of claim 1, wherein the platform is configured to extract the changed map information by using the first artificial neural network and the second artificial neural network which have been trained.

3. The platform for providing information for updating a map of claim 1, wherein the platform is configured to transmit the captured image to the server when there is the consent of the user.

4. The platform for providing information for updating a map of claim 1,
   wherein the platform is further configured to provide rewards including savings, mileage, or points to a user who consents to the image transmission.

5. The platform for providing information for updating a map of claim 1, wherein the platform is implemented in the server or a hardware processor separated from the server.

\* \* \* \* \*